(12) United States Patent
Yu et al.

(10) Patent No.: US 11,275,810 B2
(45) Date of Patent: Mar. 15, 2022

(54) ARTIFICIAL INTELLIGENCE-BASED TRIPLE CHECKING METHOD AND APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Miao Yu, Beijing (CN); Renkai Yang, Beijing (CN); Jiepeng Zheng, Beijing (CN); Pengcheng Yuan, Beijing (CN); Xiaobo Liu, Beijing (CN)

(73) Assignee: BAIDU ONLINE NETWORK TECHNOLOGY (Beijing) Co., LTD., Beijing (CN)

( * ) Notice: Subject to any disclaimer, the term of this patent is extended or adjusted under 35 U.S.C. 154(b) by 674 days.

(21) Appl. No.: 16/218,174

(22) Filed: Dec. 12, 2018

(65) Prior Publication Data

US 2019/0294648 A1    Sep. 26, 2019

(30) Foreign Application Priority Data

Mar. 23, 2018    (CN) .......................... 201810244843.4

(51) Int. Cl.
*G06F 16/00*     (2019.01)
*G06F 16/9538*   (2019.01)
(Continued)

(52) U.S. Cl.
CPC .... *G06F 16/9538* (2019.01); *G06F 16/24578* (2019.01); *G06F 16/953* (2019.01); *G06F 16/9532* (2019.01)

(58) Field of Classification Search
CPC .............. G06F 16/9532; G06F 16/953; G06F 16/24578
(Continued)

(56) References Cited

U.S. PATENT DOCUMENTS

| 7,346,839 B2 | 3/2008 | Acharya et al. |
| 7,426,507 B1 | 9/2008 | Patterson |
| 7,577,643 B2 | 8/2009 | Dominowska et al. |

(Continued)

FOREIGN PATENT DOCUMENTS

| CN | 1928864 A | 3/2007 |
| CN | 101151615 A | 3/2008 |

(Continued)

OTHER PUBLICATIONS

Liu, Shuangyan; d'Aquin, Mathieu and Motta, Enrico. Measuring Accuracy of Triples in Knowledge Graphs. In: Language, Data, and Knowledge: First International Conference, LDK2017 Galway, Ireland, Jun. 19-20, 2017 Proceedings (Gracia, Jorge; Bond, Francis; McCrae, John P.; Buitelaar, Paul; Chiar (Year: 2017).*

(Continued)

*Primary Examiner* — Alexandria Y Bromell
(74) *Attorney, Agent, or Firm* — Seed IP Law Group LLP

(57) ABSTRACT

The present disclosure provides an artificial intelligence-based triple checking method and apparatus, a device and a storage medium. The method comprises: generating a search query according to a triple to be checked; obtaining webpages of search result corresponding to the query; determining a confidence score of the triple according to the webpages of search result; determining whether the triple is an accurate triple according to the confidence score. The solution of the present disclosure can be employed to achieve efficient check of the triple.

17 Claims, 4 Drawing Sheets

(51) Int. Cl.
*G06F 16/9532* (2019.01)
*G06F 16/2457* (2019.01)
*G06F 16/953* (2019.01)

(58) Field of Classification Search
USPC .......................................................... 707/748
See application file for complete search history.

(56) References Cited

U.S. PATENT DOCUMENTS

| | | |
|---|---|---|
| 7,636,714 B1 | 12/2009 | Lamping et al. |
| 7,814,099 B2 | 10/2010 | Wang |
| 7,895,223 B2 | 2/2011 | Toebes |
| 8,166,045 B1 | 4/2012 | Mazumdar et al. |
| 9,922,290 B2 | 3/2018 | Thomas et al. |
| 10,242,049 B2 | 3/2019 | Ma et al. |
| 10,282,664 B2 | 5/2019 | Sun et al. |
| 2007/0088692 A1 | 4/2007 | Dean et al. |
| 2008/0077577 A1* | 3/2008 | Byrne ................... G06F 16/951 707/707 |
| 2008/0195570 A1 | 8/2008 | Alsafadi et al. |
| 2012/0072287 A1 | 3/2012 | Crane et al. |
| 2012/0077178 A1* | 3/2012 | Bagchi ..................... G09B 7/00 434/362 |
| 2012/0078636 A1* | 3/2012 | Ferrucci ............ G06F 16/24564 704/270.1 |
| 2012/0296918 A1* | 11/2012 | Morris ................ G06F 16/3331 707/748 |
| 2013/0166303 A1* | 6/2013 | Chang ................ G06F 16/7834 704/258 |
| 2015/0006501 A1* | 1/2015 | Talmon ............... G06F 16/9024 707/708 |
| 2015/0169738 A1* | 6/2015 | Duerig ..................... G06K 9/66 707/749 |
| 2018/0240008 A1* | 8/2018 | Boxwell ............. G06F 16/3329 707/707 |
| 2018/0341866 A1 | 11/2018 | Huang et al. |
| 2019/0065576 A1* | 2/2019 | Peng ....................... G06F 16/22 707/707 |
| 2019/0279104 A1* | 9/2019 | Brake ..................... G06F 40/30 707/707 |

FOREIGN PATENT DOCUMENTS

| | | |
|---|---|---|
| CN | 101414310 A | 4/2009 |
| CN | 101501630 A | 8/2009 |
| CN | 101506769 A | 8/2009 |
| CN | 101963971 A | 2/2011 |
| CN | 102063476 A | 5/2011 |
| CN | 102214189 A | 10/2011 |
| CN | 102332015 A | 1/2012 |
| CN | 102693320 A | 9/2012 |
| CN | 103136220 A | 6/2013 |
| CN | 103455491 A | 12/2013 |
| CN | 103646034 A | 3/2014 |
| CN | 103699689 A | 4/2014 |
| CN | 104166653 A | 11/2014 |
| CN | 104573028 A | 4/2015 |
| CN | 104679783 A | 6/2015 |
| CN | 104915420 A | 9/2015 |
| CN | 105069045 A | 11/2015 |
| CN | 106469097 A | 3/2017 |
| CN | 106528849 A | 3/2017 |
| CN | 106547887 A | 3/2017 |
| CN | 106575395 A | 4/2017 |
| CN | 106874380 A | 6/2017 |
| CN | 107402954 A | 11/2017 |
| CN | 107451164 A | 12/2017 |
| CN | 107748757 A | 3/2018 |
| JP | 2012-519901 A | 8/2012 |
| JP | 2015-75854 A | 4/2015 |
| KR | 10-2009-0119383 A | 11/2009 |

OTHER PUBLICATIONS

Notice of Allowance, dated May 12, 2021, for U.S. Appl. No. 10-2018-0161868, Miao Yu et al., "Artificial Intelligence-Based Triple Checking Method and Apparatus, Device and Storage Medium," 3 pages.

* cited by examiner

ARTIFICIAL INTELLIGENCE-BASED TRIPLE CHECKING METHOD AND APPARATUS, DEVICE AND STORAGE MEDIUM

CROSS-REFERENCE TO RELATED APPLICATION(S)

The present application claims the priority of Chinese Patent Application No. 201810244843.4, filed on Mar. 23, 2018, with the title of "Artificial intelligence-based triple checking method and apparatus, device and storage medium." The disclosure of the above applications is incorporated herein by reference in its entirety.

BACKGROUND

Technical Field

The present disclosure relates to computer application technologies, and particularly to an artificial intelligence-based triple checking method and apparatus, a device and a storage medium.

Description of the Related Art

Artificial intelligence, abbreviated as AI, is a new technical science for researching and developing theories, methods, technologies and application systems for simulating, extending and expanding human intelligence. Artificial intelligence is a branch of computer sciences and attempts to learn about the essence of intelligence, and produces a type of new intelligent machines capable of responding in a manner similar to human intelligence. The studies in the field comprise robots, language recognition, image recognition, natural language processing, expert systems and the like.

Precise question and answer is a product which is different a natural result presentation form and directly satisfies the user's search demands precisely. In the precise question and answer product, ensuring accuracy of a structured Subject Predicate Object (SPO) triple is a basic requirement for the precise question and answer product, and meanwhile also a basis for satisfying the user's search demands and improving the user's experience.

The SPO triple is a basic unit of structured data in a knowledge map, for example, in a SPO triple, S=Liu*Hua, P=wife, O=Zhu*Qian.

To obtain an accurate SPO triple, the following processing manners are usually employed in the prior art:

1) extracting an accurate SPO triple from a high-quality website;

2) providing an accurate SPO triple based on manual verification and annotation.

The above two manners are applicable for a small scale of data. However, as Information Extraction (IE) technology gradually iterates and gets mature, the SPO triple data is unprecedentedly expanded, and a large scale of SPO triple data cannot be checked in a unified and effective manner due to limitations of unsustainability high-quality website and manual verification and annotation, and becomes a bottleneck for further expansion of the knowledge map.

BRIEF SUMMARY

With respect to the above, the present disclosure provides an artificial intelligence-based triple checking method and apparatus, a device and a storage medium.

Specific technical solutions are as follows:

An artificial intelligence-based triple checking method, comprising:
generating a search query according to a triple to be checked;
obtaining webpages of search result corresponding to the query;
determining a confidence score of the triple according to the webpages of search result;
determining whether the triple is an accurate triple according to the confidence score.

According to a preferred embodiment of the present embodiment, the step of determining a confidence score of the triple according to the webpages of search result comprises:
selecting M qualified webpages from the webpages of search result, and taking the selected webpages as to-be-processed webpages, M being a positive integer larger than 1;
respectively performing the following processing with respect to each to-be-processed webpage:
if the to-be-processed webpage includes information of the triple, respectively obtaining N predetermined parameter values of the to-be-processed webpage, N being a positive integer, and determining a quality score of the to-be-processed webpage according to the N predetermined parameter values;
if the to-be-processed webpage does not include information of the triple, taking zero as the quality score of the to-be-processed webpage;
determining the confidence score of the triple according to the quality score of to-be-processed webpages.

According to a preferred embodiment of the present embodiment, the M qualified webpages comprise: top M webpages ranking in the search result page;
after selecting M qualified webpages from the webpages of search result, further comprising:
pre-processing the selected M qualified webpages, the pre-processing comprising: performing deduplication processing, and taking the webpages after the pre-processing as to-be-processed webpages.

According to a preferred embodiment of the present embodiment, the deduplication processing comprises: retaining a webpage from a source site having the highest reliability in webpages with repeated content.

According to a preferred embodiment of the present embodiment, the N predetermined parameter values comprise:
reliability of a source site of the to-be-processed webpage;
a relevancy of content of the to-be-processed webpage and the triple;
reliability of the content of the to-be-processed webpage.

According to a preferred embodiment of the present embodiment, the step of determining a quality score of the to-be-processed webpage according to the N predetermined parameter values comprises:
calculating a product of the N predetermined parameter values, and taking a calculation result as a quality score of the to-be-processed webpage;
the step of determining the confidence score of the triple according to the quality scores of to-be-processed webpages comprises:
summating the quality scores of the respective to-be-processed webpages, and taking a sum as the confidence score of the triple.

According to a preferred embodiment of the present embodiment, the step of determining whether the triple is an accurate triple according to the confidence score comprises:

comparing the confidence score with a preset first threshold;

determining that the triple is an accurate triple if the confidence score is larger than the first threshold.

According to a preferred embodiment of the present embodiment, the method further comprises:

if the triple is determined as an accurate triple, ranking respective to-be-processed webpages in a descending order of quality scores, and selecting top N' webpages in the ranking, N' being a positive integer;

selecting, from the selected N' webpages, a webpage whose quality score is greater than a preset second threshold, and taking a finally-selected webpage as a webpage corpus data auxiliary evidence of the triple.

According to another aspect of the present disclosure, there is provided an artificial intelligence-based triple checking apparatus, comprising: a generating unit, an obtaining unit, a scoring unit and a checking unit;

the generating unit is configured to generate a search query according to a triple to be checked;

the obtaining unit is configured to obtain webpages of search result corresponding to the query;

the scoring unit is configured to determine a confidence score of the triple according to the webpages of search result;

the checking unit is configured to determine whether the triple is an accurate triple according to the confidence score.

According to a preferred embodiment of the present embodiment, the scoring unit comprises: a selecting subunit and a processing subunit;

the selecting subunit selects M qualified webpages from the webpages of search result, and regards the selected webpages as to-be-processed webpages, M being a positive integer larger than 1;

the processing subunit respectively performs the following processing with respect to each to-be-processed webpage:

if the to-be-processed webpage includes information of the triple, respectively obtain N predetermined parameter values of the to-be-processed webpage, N being a positive integer, and determine a quality score of the to-be-processed webpage according to the N predetermined parameter values;

if the to-be-processed webpage does not include information of the triple, regard zero as the quality score of the to-be-processed webpage;

determine the confidence score of the triple according to the quality score of to-be-processed webpages.

According to a preferred embodiment of the present embodiment, the M qualified webpages comprise: top M webpages ranking in the search result page;

the selecting subunit is further configured to, after selecting M qualified webpages from the webpages of search result, pre-process the selected M qualified webpages, the pre-processing comprising: performing deduplication processing, and taking the webpages after the pre-processing as to-be-processed webpages.

According to a preferred embodiment of the present embodiment, the deduplication processing comprises retaining a webpage from a source site having the highest reliability in webpages with repeated content.

According to a preferred embodiment of the present embodiment, the N predetermined parameter values comprise:

reliability of a source site of the to-be-processed webpage;

a relevancy of content of the to-be-processed webpage and the triple;

reliability of the content of the to-be-processed webpage.

According to a preferred embodiment of the present embodiment, taking each to-be-processed webpage, the processing subunit respectively calculates a product of the N predetermined parameter values, and regards a calculation result as a quality score of the to-be-processed webpage;

the processing subunit summates quality scores of the respective to-be-processed webpages, and regards a sum as the confidence score of the triple.

According to a preferred embodiment of the present embodiment, the checking unit compares the confidence score with a preset first threshold, and determines that the triple is an accurate triple if the confidence score is larger than the first threshold.

According to a preferred embodiment of the present embodiment, the checking unit is further configured to, if the triple is determined as an accurate triple, rank respective to-be-processed webpages in a descending order of quality scores, and select top N' webpages in the ranking, N' being a positive integer, further select, from the selected N' webpages, a webpage whose quality score is greater than a preset second threshold, and regard a finally-selected webpage as a webpage corpus data auxiliary evidence of the triple. A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As known from the above introduction, according to the solutions of the present disclosure, it is possible to generate a search query according to a triple to be checked, then obtain webpages of search result corresponding to the query, determine a confidence score of the triple according to the webpages of search result, and determine whether the triple is an accurate triple according to the confidence score. That is to say, in the solutions of the present disclosure, it is possible to achieve efficient check of the triple based on the search result, effectively check the accuracy of the triple, and break away from constraint of limited high-quality websites, and meanwhile substantially reduce manpower and time costs consumed by manual verification and annotation, and expand data coverage of the knowledge map.

DETAILED DESCRIPTION

With respect to problems existing in the prior art, the present disclosure provides an artificial intelligence-based triple checking manner in which accuracy of the triple can be effectively checked based on a search result. Preferably, the triple is an SPO triple.

To make the technical solution of the present disclosure clearer and more apparent, the technical solution of the present disclosure will be further described by referring to figures and listing embodiments by taking the SPO triple as an example.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
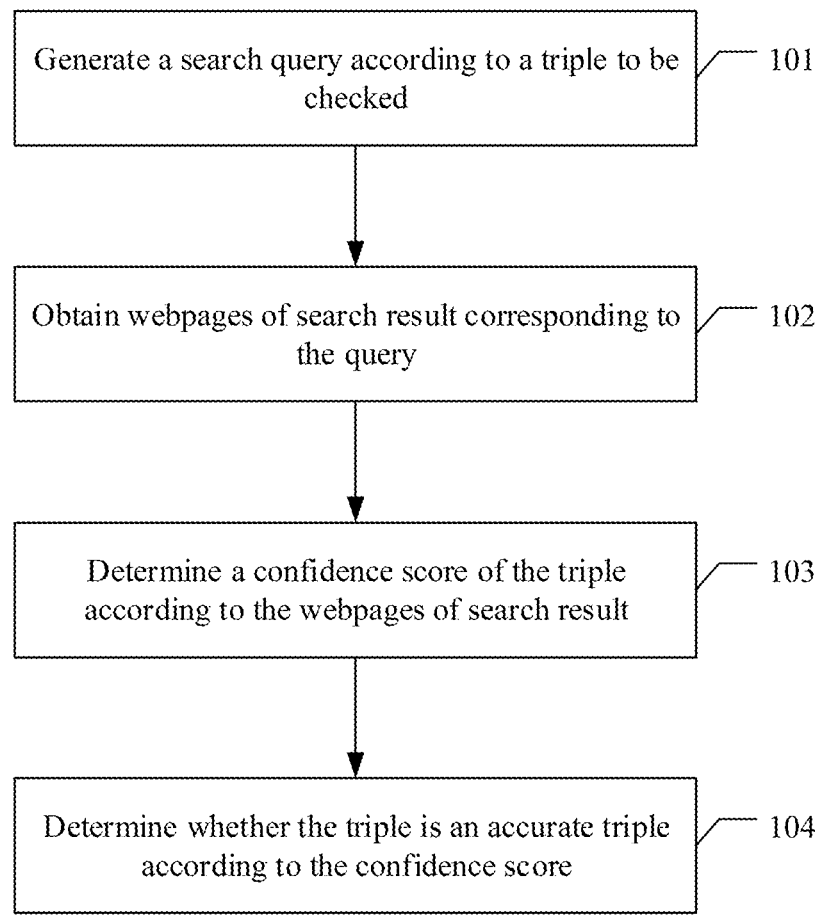
FIG. 1 is a flow chart of a first embodiment of an artificial intelligence-based SPO triple checking method according to the present disclosure.

FIG. 1 is a flow chart of a first embodiment of an artificial intelligence-based SPO triple checking method according to the present disclosure. As shown in FIG. 1, the method comprises the following specific implementation mode:

At 101, generate a search query according to an SPO triple to be checked.

At 102, obtain webpages of search result corresponding to the query.

At 103, determine a confidence score of the SPO triple according to the webpages of search result.

At 104, determine whether the SPO triple is an accurate SPO triple according to the confidence score.

Regarding any SPO triple, when it needs to be checked, it is possible to first generate the search query according to the SPO triple, i.e., form a search sentence according to the original unconfirmed SPO triple.

For example, S=Liu*Hua, P=wife, O=Zhu*Qian, and they may form a query=Liu*Hua wife Zhu*Qian.

It is possible to use the above query to search in a search engine to obtain webpages of search result returned by the search engine. It is possible to select, from the webpages of search result, M qualified webpages, regard the selected webpages as to-be-processed webpages, and perform subsequent processing with the to-be-processed webpages. M is a positive integer larger than 1. A specific value thereof may depend on actual needs.

For example, it is possible to select top M webpages ranking in the webpages of search result. Furthermore, it is possible to further pre-process the selected M webpages, namely, perform cleaning and tidy-up for the selected M webpages, for example perform deduplication processing, and then regard the webpages after the pre-processing as to-be-processed webpages.

The deduplication processing may refer to retaining a webpage from a source site having the highest reliability in webpages with repeated content. For example, if two webpages have repeated content, it is possible to compare reliability of source sites of the two webpages, and retain the webpage from a source site having a high reliability, namely, retain a webpage from a high-quality website.

The reliability of the site may also be called as a confidence degree or confidence value of the site and used to reflect whether the site is a reliable site. How to obtain the reliability of the site is not limited. For example, it is possible to respectively generate and store reliability of reliability of respective sites by evaluating quality of all aspects of respective sites. As such, it is possible to directly query for the stored reliability of any site if necessary.

It is possible to, through the deduplication processing, prevent mutual plagiarism of gossipy public opinions and information of low-quality sites, which affects subsequent processing results. In addition to the deduplication processing, it is feasible to perform other pre-processing for the selected webpage according to actual needs, for example, to remove webpages with unhealthy content.

Then, the confidence score of the SPO triple may be determined according to the obtained to-be-processed webpage.

Specifically, the following processing may be performed for each to-be-processed webpage: if the to-be-processed webpage includes SPO information, respectively obtain N predetermined parameter values of the to-be-processed webpage, N being a positive integer, and determine a quality score of the to-be-processed webpage according to the N predetermined parameter values; if the to-be-processed webpage does not include SPO information, regard zero as the quality score of the to-be-processed webpage; then determine the confidence score of the SPO triple according to the quality score of to-be-processed webpages.

The to-be-processed webpage including SPO information usually means that the to-be-processed webpage simultaneously includes S, P and O, and S, P and O may appear continuously or uncontinuously.

If the to-be-processed webpage includes SPO information, it is possible to further obtain the N predetermined parameter values of the to-be-processed webpage, for example, reliability of a source site of the to-be-processed webpage, a relevancy of content of the to-be-processed webpage and the SPO triple, and reliability of the content of the to-be-processed webpage.

It is feasible to determine/calculate the relevancy of content of the to-be-processed webpage and the SPO triple according to a preset evaluation standard. For example, in the to-be-processed webpage, the relevancy in the case that S and P appear before O is believed higher than the case that O appears before S and P; or the relevancy in the case that S, P and O appear in the same sentence or the same paragraph is believed higher than the case that S, P and O appear in different paragraphs. Specific implementations are of the prior art.

In addition, it is feasible to determine/calculate the reliability of the content of the to-be-processed webpage according to a semantic analysis technology in Natural Language Processing (NLP). For example, it is feasible to determine the reliability of the content of the to-be-processed webpage according to whether the content is objective and accurate as much as possible in grammar, word use or logic. Specific implementations are also of the prior art.

It is possible to, after respectively obtaining the N predetermined parameter values, calculate a product of the N predetermined parameter values, and regard a calculation result as a quality score of the to-be-processed webpage. As stated above, if the to-be-processed webpage does not include SPO information, it is feasible to regard zero as the quality score of the to-be-processed webpage.

It is feasible to, after respectively obtaining quality scores of respective to-be-processed webpages, summate quality scores of the respective to-be-processed webpages, and regard a sum as the confidence score of the SPO triple.

Furthermore, it is feasible to compare the confidence score of the SPO triple with a preset first threshold, and determine that the SPO triple is an accurate SPO triple if the confidence score is larger than the first threshold. A specific value of the first threshold may depend on actual needs.

If the SPO triple is an accurate SPO triple, a webpage corpus data auxiliary evidence of the SPO triple may be further determined.

Specifically, it is feasible to rank respective to-be-processed webpages in a descending order of quality scores, and select top N' webpages in the ranking, N' being a positive integer. A specific value may depend on actual needs. And it is feasible to further select, from the selected N' webpages, a webpage whose quality score is greater than a preset second threshold, and regard the selected webpage as the webpage corpus data auxiliary evidence of the SPO triple. A specific value of the second threshold may also depend on actual needs.

The above processing is considered mainly from perspective of implementation of products. When the user uses a precise question-answer product, when he searches for the wife of Liu*Hua, if only an alone answer result is given, the user's experience is poor. Therefore, in practical application, it is possible to, while displaying the answer result, display a link selected as a webpage corpus data auxiliary evidence, and tell the user the content related to the answer result in the webpage. The user may click to view, thereby improving the performance of the product.

Figure 2:
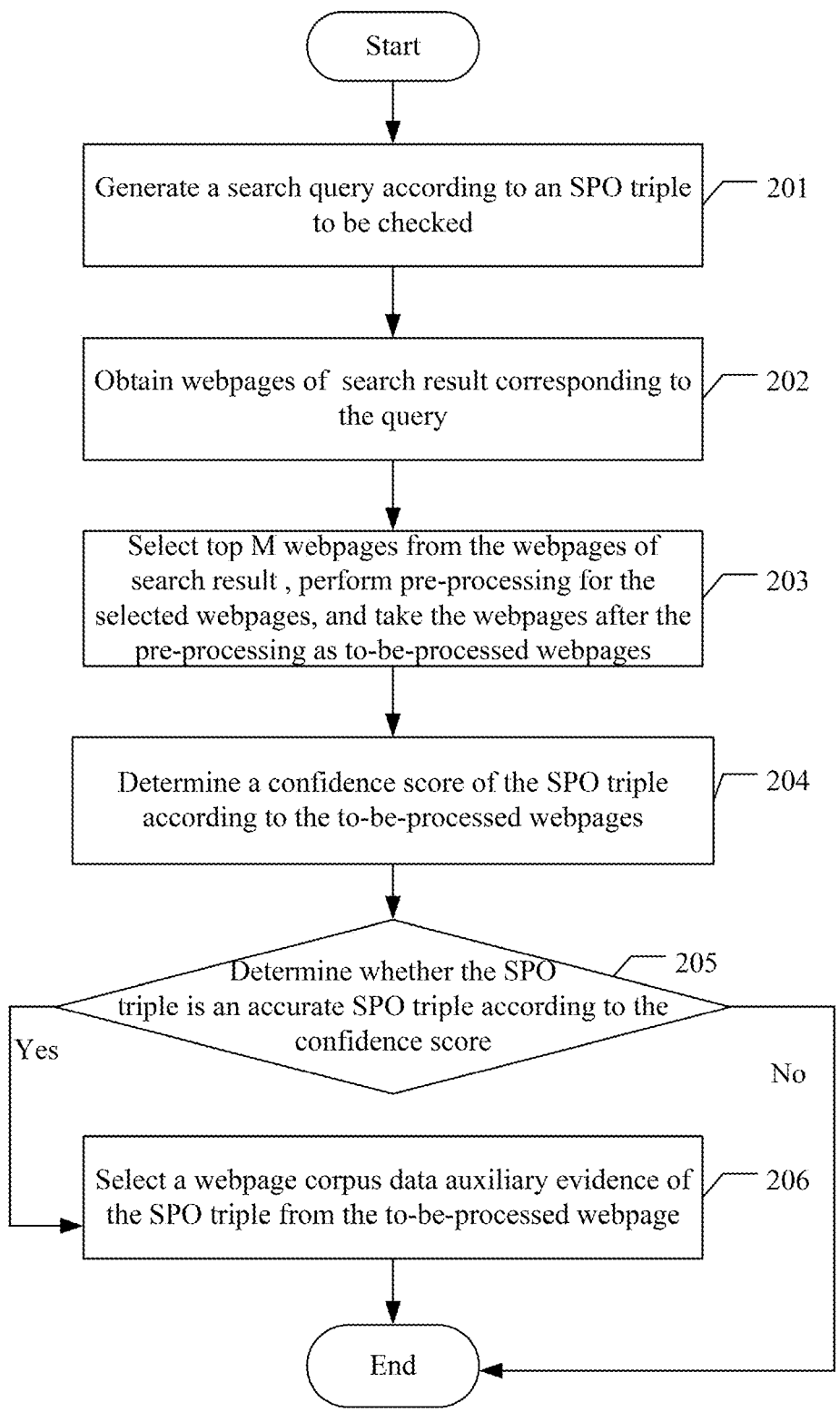
FIG. 2 is a flow chart of a second embodiment of an artificial intelligence-based SPO triple checking method according to the present disclosure.

Based on the above introduction, FIG. 2 is a flow chart of a second embodiment of an artificial intelligence-based SPO triple checking method according to the present disclosure. As shown in FIG. 2, the method comprises the following specific implementation mode:

At 201, generate a search query according to an SPO triple to be checked.

For example, S=Du*Tao, P=father, O=Du*Hao, and a query y=Du*Tao father Du*Hao may be formed.

At 202, obtain webpages of search result corresponding to the query.

The above query is used to search in the search engine to obtain the webpages of search result returned by the search engine.

At 203, select top M webpages from the webpages of search result, perform pre-processing for the selected webpage, and regard the webpages after the pre-processing as to-be-processed webpages.

The pre-processing may include deduplication processing. The deduplication processing may refer to retaining a webpage from a source site having the highest reliability in webpages with repeated content.

At 204, determine a confidence score of the SPO triple according to the to-be-processed webpages.

Preferably, it is possible to calculate to obtain the confidence score of the SPO triple according to Equation (1):

$$TC = \sum_i K_i S_i R_i P_i; \qquad (1)$$

where a value of i ranges from 1 to Q, Q representing a total number of the to-be-processed webpages.

As shown in Equation (1), it is possible to, with respect to each to-be-processed webpage, respectively obtain its corresponding $K_i$, $R_i$, and $P_i$, and calculate a product of $K_i$, $R_i$, and $P_i$, and then summate respective products to thereby obtain the confidence score TC of the SPO triple.

Regarding each to-be-processed webpage, if it includes SPO information, $K_i$ may be set as 1, otherwise set as 0. For example, if the information "Du*Tao", "father" and "Du*Hao" simultaneously appear in the to-be-processed webpage, $K_i$ may be set as 1, otherwise set as 0.

$S_i$ represents a confidence of a source site of the to-be-processed webpage. $R_i$ represents the relevancy of the content of the to-be-processed webpage and the SPO triple. $P_i$ represents a confidence of the content of the to-be-processed webpage. Values of $S_i$, $R_i$ and $P_i$ are all between 0 and 1.

Regarding any to-be-processed webpage, if its $K_i$ is 0, it is unnecessary to calculate $S_i$, $R_i$ and $P_i$ of the to-be-processed webpages because the product obtained from the calculation is 0 whatever the calculation result is.

It needs to be appreciated that the manner of calculating the confidence score according to Equation (1) is only for illustration purpose and not intended to limit the technical solution of the present disclosure. In practical application, other calculating manners that can be envisaged by those skilled in the art may also be employed so long as they can achieve the purpose of effectively evaluating the confidence of the SPO triple.

At 205, determine whether the SPO triple is an accurate SPO triple according to the confidence score, and if yes, perform 206, or if no, end up the process.

It is feasible to, after calculating the TC, compare the TC with a first threshold EC, and if TC>EC, determine that the SPO triple is an accurate SPO triple, i.e., determine that the SPO triple satisfies the check.

At 206, select a webpage corpus data auxiliary evidence of the SPO triple from the to-be-processed webpage, and end up the process.

If the SPO triple is determined as an accurate SPO triple, it is possible to, with respect to to-be-processed webpages whose $K_i$ is 1, rank in a descending order of products of $S_i$, $R_i$ and $P_i$, select top N' webpages in the ranking, N' being a positive integer, and further select, from the selected N' webpages, webpages whose products of $S_i$, $R_i$ and $P_i$ are greater than a preset second threshold, and regard finally-selected webpages as webpage corpus data auxiliary evidences of the SPO triple.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

To sum up, the solution of the above method embodiment may be employed to achieve efficient check of the SPO triple based on the search result, effectively check the accuracy of the SPO triple, and break away from constraint of limited high-quality websites, and meanwhile substantially reduce manpower and time costs consumed by manual verification and annotation, and expand data coverage of the knowledge map.

The above is introduction of the method embodiment. The solution of the present disclosure will be further described through an apparatus embodiment.

Figure 3:
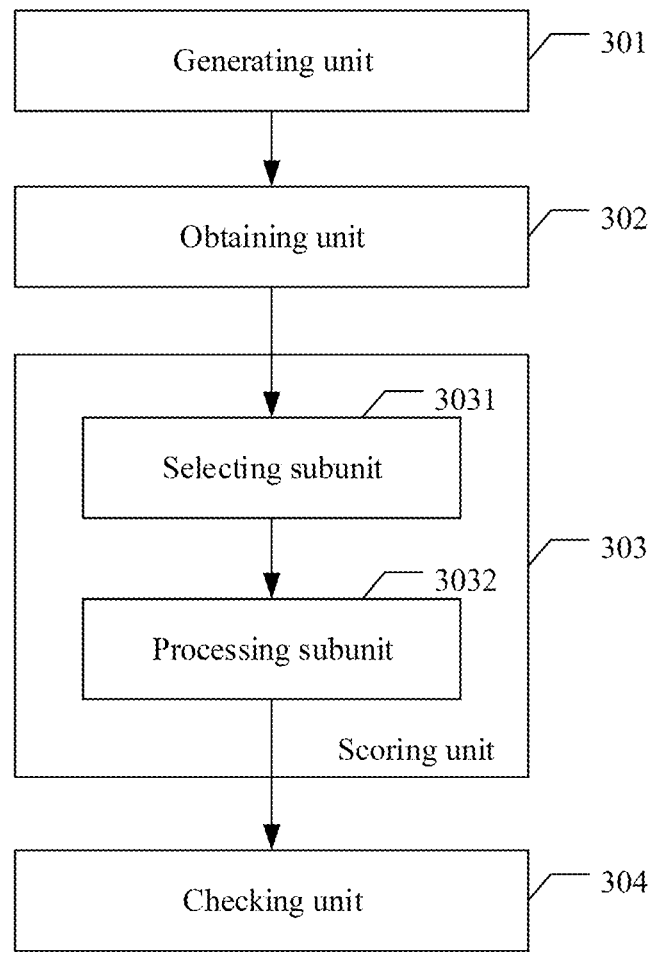
FIG. 3 is a structural schematic diagram of an artificial intelligence-based SPO triple checking apparatus according to the present disclosure.

FIG. 3 is a structural schematic diagram of an artificial intelligence-based SPO triple checking apparatus according to the present disclosure. As shown in FIG. 3, the apparatus comprises: a generating unit 301, an obtaining unit 302, a scoring unit 303 and a checking unit 304.

The generating unit 301 is configured to generate a search query according to an SPO triple to be checked.

The obtaining unit 302 is configured to obtain webpages of search result corresponding to the query.

The scoring unit 303 is configured to determine a confidence score of the SPO triple according to the webpages of search result.

The checking unit 304 is configured to determine whether the SPO triple is an accurate SPO triple according to the confidence score.

Regarding any SPO triple, when it needs to be checked, first the generating unit 301 generates the search query according to the SPO triple, i.e., forms a search sentence according to the original unconfirmed SPO triple.

The obtaining unit 302 may use the above query to search in a search engine to obtain webpages of search result returned by the search engine. It is possible to select, from the webpages of search result, and then the scoring unit 303 determines the confidence score of the SPO triple according to the webpages of search result.

As shown in FIG. 3, the scoring unit 303 may specifically comprise: a selecting subunit 3031 and a processing subunit 3032.

The selecting subunit 3031 may select, from the webpages of search result, M qualified webpages, and regard the selected webpages as to-be-processed webpages, M being a positive integer larger than 1. For example, the selecting subunit 3031 may select top M webpages ranking in the webpages of search result. Furthermore, the selecting subunit 3031 may further pre-process the selected M webpages, namely, perform cleaning and tidy-up for the selected M webpages, for example perform deduplication processing, and then regard the webpages after the pre-processing as to-be-processed webpages.

The deduplication processing may refer to retaining a webpage from a source site having the highest reliability in webpages with repeated content. The processing subunit 3032 may respectively perform the following processing with respect to each to-be-processed webpage:
- if the to-be-processed webpage includes SPO information, respectively obtain N predetermined parameter values of the to-be-processed webpage, N being a positive integer, and determine a quality score of the to-be-processed webpage according to the N predetermined parameter values;
- if the to-be-processed webpage does not include SPO information, regard zero as the quality score of the to-be-processed webpage;
- determine the confidence score of the SPO triple according to the quality score of to-be-processed webpages.

The N predetermined parameter values may comprise: reliability of a source site of the to-be-processed webpage, a relevancy of content of the to-be-processed webpage and the SPO triple, and reliability of the content of the to-be-processed webpage.

In addition, regarding each to-be-processed webpage, the processing subunit 3032 may respectively calculate a product of the N predetermined parameter values, and regard a calculation result as a quality score of the to-be-processed webpage. The processing subunit 3032 may further summate quality scores of the respective to-be-processed webpages, and regard a sum as the confidence score of the SPO triple.

After the confidence score of the SPO triple is obtained, the checking unit 304 may compare the confidence score with a preset first threshold, and determine that the SPO triple is an accurate SPO triple if the confidence score is larger than the first threshold.

If the SPO triple is an accurate SPO triple, a webpage corpus data auxiliary evidence of the SPO triple may be further determined.

For example, the checking unit 304 may rank respective to-be-processed webpages in a descending order of quality scores, and select top N' webpages in the ranking, N' being a positive integer, further select, from the selected N' webpages, a webpage whose quality score is greater than a preset second threshold, and regard the finally-selected webpage as a webpage corpus data auxiliary evidence of the SPO triple.

Reference may be made to corresponding depictions in the aforesaid method embodiment for a specific workflow of the apparatus embodiment shown in FIG. 3. No detailed depictions are given here.

The SPO triple is taken as an example in the above embodiments, but the solution of the present disclosure is not limited to the SPO triple. The solution of the present disclosure also applies to other triples having accuracy checking demands.

Figure 4:
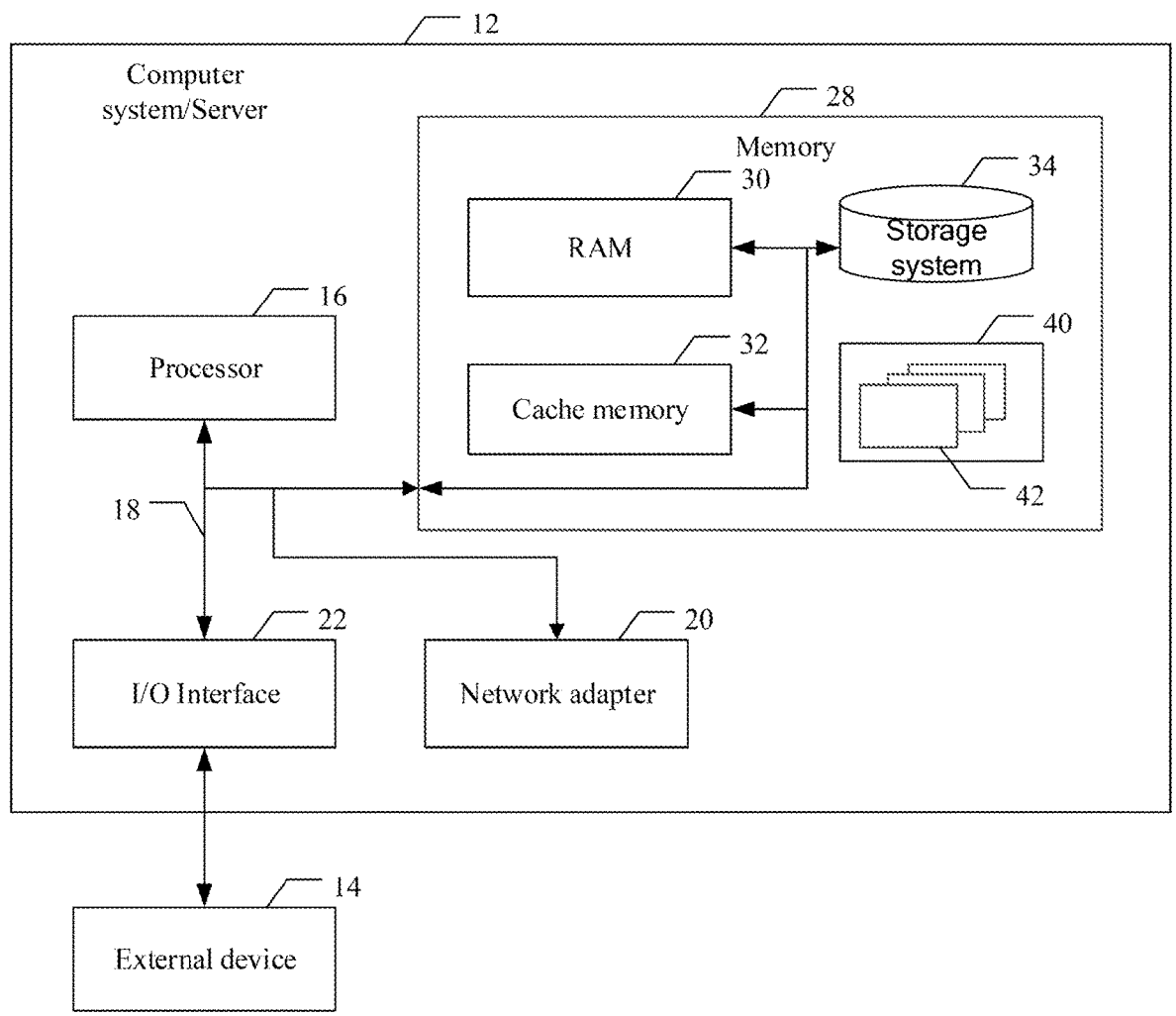
FIG. 4 illustrates a block diagram of an example computer system/server adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or FIG. 2.

The present disclosure meanwhile provides a computer-readable storage medium on which a computer program is stored, the program, when executed by the processor, implementing the method stated in the embodiment shown in FIG. 1 or FIG. 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

The invention claimed is:

1. An artificial intelligence-based triple checking method, comprising:
   generating a search query according to a triple to be checked;
   obtaining webpages of search result corresponding to the query;
   determining a confidence score of the triple according to the webpages of search result;
   determining whether the triple is an accurate triple according to the confidence score, wherein, the step of determining a confidence score of the triple according to the webpages of search result comprises:
   selecting M qualified webpages from the webpages of search result, and taking the selected webpages as to-be-processed webpages, M being a positive integer larger than 1;
   respectively performing the following processing with respect to each to-be-processed webpage:
      if the to-be-processed webpage includes information of the triple, respectively obtaining N predetermined parameter values of the to-be-processed webpage, N being a positive integer, and determining a quality score of the to-be-processed webpage according to the N predetermined parameter values;
      if the to-be-processed webpage does not include information of the triple, taking zero as the quality score of the to-be-processed webpage;
   determining the confidence score of the triple according to the quality score of to-be-processed webpages.

2. The method according to claim 1, wherein the M qualified webpages comprise:
   top M webpages ranking in the search result page;
   after selecting M qualified webpages from the webpages of search result, further comprising:
      pre-processing the selected M qualified webpages, the pre-processing comprising:
         performing deduplication processing, and taking the webpages after the pre-processing as to-be-processed webpages.

3. The method according to claim 2, wherein the deduplication processing comprises:
   retaining a webpage from a source site having the highest reliability in webpages with repeated content.

4. The method according to claim 1, wherein the N predetermined parameter values comprise:
   reliability of a source site of the to-be-processed webpage;
   a relevancy of content of the to-be-processed webpage and the triple;
   reliability of the content of the to-be-processed webpage.

5. The method according to claim 1, wherein
   the step of determining a quality score of the to-be-processed webpage according to the N predetermined parameter values comprises:
      calculating a product of the N predetermined parameter values, and taking a calculation result as a quality score of the to-be-processed webpage;
   the step of determining the confidence score of the triple according to the quality scores of to-be-processed webpages comprises:
      summating the quality scores of the respective to-be-processed webpages, and taking a sum as the confidence score of the triple.

6. The method according to claim 1, wherein the step of determining whether the triple is an accurate triple according to the confidence score comprises:
   comparing the confidence score with a preset first threshold;
   determining that the triple is an accurate triple if the confidence score is larger than the first threshold.

7. The method according to claim 1, wherein the method further comprises:
   if the triple is determined as an accurate triple, ranking respective to-be-processed webpages in a descending order of quality scores, and selecting top N' webpages in the ranking, N' being a positive integer;
   selecting, from the selected N' webpages, a webpage whose quality score is greater than a preset second threshold, and taking a finally-selected webpage as a webpage corpus data auxiliary evidence of the triple.

8. A computer device, comprising a memory, a processor and a computer program which is stored on the memory and runnable on the processor, wherein the processor, upon executing the program, implements an artificial intelligence-based triple checking method, wherein the method comprises:
   generating a search query according to a triple to be checked;
   obtaining webpages of search result corresponding to the query;
   determining a confidence score of the triple according to the webpages of search result;
   determining whether the triple is an accurate triple according to the confidence score, wherein the step of determining a confidence score of the triple according to the webpages of search result comprises:
   selecting M qualified webpages from the webpages of search result, and taking the selected webpages as to-be-processed webpages, M being a positive integer larger than 1;
   respectively performing the following processing with respect to each to-be-processed webpage:
      if the to-be-processed webpage includes information of the triple, respectively obtaining N predetermined parameter values of the to-be-processed webpage, N being a positive integer, and determining a quality score of the to-be-processed webpage according to the N predetermined parameter values;
      if the to-be-processed webpage does not include information of the triple, taking zero as the quality score of the to-be-processed webpage;
   determining the confidence score of the triple according to the quality score of to-be-processed webpages.

9. The computer device according to claim 8, wherein the M qualified webpages comprise:
   top M webpages ranking in the search result page;
   after selecting M qualified webpages from the webpages of search result, further comprising:
      pre-processing the selected M qualified webpages, the pre-processing comprising: performing deduplication processing, and taking the webpages after the pre-processing as to-be-processed webpages.

10. The computer device according to claim 9, wherein the deduplication processing comprises:
   retaining a webpage from a source site having the highest reliability in webpages with repeated content.

11. The computer device according to claim 8, wherein the N predetermined parameter values comprise:
   reliability of a source site of the to-be-processed webpage;
   a relevancy of content of the to-be-processed webpage and the triple;
   reliability of the content of the to-be-processed webpage.

12. The computer device according to claim 8, wherein
   the step of determining a quality score of the to-be-processed webpage according to the N predetermined parameter values comprises:
      calculating a product of the N predetermined parameter values, and taking a calculation result as a quality score of the to-be-processed webpage;
   the step of determining the confidence score of the triple according to the quality scores of to-be-processed webpages comprises:
      summating the quality scores of the respective to-be-processed webpages, and taking a sum as the confidence score of the triple.

13. The computer device according to claim 8, wherein the step of determining whether the triple is an accurate triple according to the confidence score comprises:
   comparing the confidence score with a preset first threshold;
   determining that the triple is an accurate triple if the confidence score is larger than the first threshold.

14. The computer device according to claim 8, wherein the method further comprises:
   if the triple is determined as an accurate triple, ranking respective to-be-processed webpages in a descending order of quality scores, and selecting top N' webpages in the ranking, N' being a positive integer;
   selecting, from the selected N' webpages, a webpage whose quality score is greater than a preset second threshold, and taking a finally-selected webpage as a webpage corpus data auxiliary evidence of the triple.

15. A non-transitory computer-readable storage medium on which a computer program is stored, wherein the program, when executed by a processor, implements an artificial intelligence-based triple checking method, wherein the method comprises:
   generating a search query according to a triple to be checked;
   obtaining webpages of search result corresponding to the query;
   determining a confidence score of the triple according to the webpages of search result;
   determining whether the triple is an accurate triple according to the confidence score, wherein the step of determining a confidence score of the triple according to the webpages of search result comprises:
   selecting M qualified webpages from the webpages of search result, and taking the selected webpages as to-be-processed webpages, M being a positive integer larger than 1;
   respectively performing the following processing with respect to each to-be-processed webpage:
      if the to-be-processed webpage includes information of the triple, respectively obtaining N predetermined parameter values of the to-be-processed webpage, N being a positive integer, and determining a quality score of the to-be-processed webpage according to the N predetermined parameter values;
      if the to-be-processed webpage does not include information of the triple, taking zero as the quality score of the to-be-processed webpage;
   determining the confidence score of the triple according to the quality score of to-be-processed webpages.

16. The non-transitory computer-readable storage medium according to claim 15, wherein the M qualified webpages comprise:
   top M webpages ranking in the search result page;
   after selecting M qualified webpages from the webpages of search result, further comprising:
      pre-processing the selected M qualified webpages, the pre-processing comprising: performing deduplication processing, and taking the webpages after the pre-processing as to-be-processed webpages.

17. The non-transitory computer-readable storage medium according to claim 16, wherein the deduplication processing comprises: retaining a webpage from a source site having the highest reliability in webpages with repeated content.

* * * * *